United States Patent
Lee et al.

(10) Patent No.: US 6,367,985 B1
(45) Date of Patent: Apr. 9, 2002

(54) OPTICAL CONNECTOR USING LARGE DIAMETER ALIGNMENT FEATURES

(75) Inventors: Nicholas A. Lee, Woodbury; Scott A. Igl, St. Paul; Gordon D. Henson, Lake Elmo, all of MN (US)

(73) Assignee: Intellectual Property Company, Saint Paul, MN (US)

( * ) Notice: Subject to any disclaimer, the term of this patent is extended or adjusted under 35 U.S.C. 154(b) by 0 days.

(21) Appl. No.: 09/201,798

(22) Filed: Nov. 30, 1998

Related U.S. Application Data

(63) Continuation-in-part of application No. 08/953,950, filed on Oct. 20, 1997, now Pat. No. 5,845,028, which is a continuation of application No. 08/614,412, filed on Mar. 12, 1996, now Pat. No. 5,778,123, and a continuation-in-part of application No. 08/819,247, filed on Mar. 17, 1997.

(51) Int. Cl.[7] ................................. G02B 6/36
(52) U.S. Cl. ............... 385/59; 385/64; 385/65; 385/71; 385/83
(58) Field of Search .................. 385/55–65, 71–73, 385/76–83

(56) References Cited

U.S. PATENT DOCUMENTS

| | | | |
|---|---|---|---|
| 4,087,155 A | * 5/1978 | Deacon | 385/64 |
| 4,204,310 A | 5/1980 | Auracher et al. | 29/445 |
| 4,217,029 A | * 8/1980 | Kao | 385/64 |
| 4,786,135 A | * 11/1988 | Boero | 385/79 |
| 4,830,456 A | * 5/1989 | Kakii et al. | 385/75 |
| 5,257,332 A | * 10/1993 | Pimpinella | 385/59 |
| 5,268,981 A | 12/1993 | Shahid | 385/71 |
| 5,548,677 A | * 8/1996 | Kakii et al. | 385/92 |
| 5,574,814 A | 11/1996 | Noddings et al. | 385/90 |

FOREIGN PATENT DOCUMENTS

| | | | |
|---|---|---|---|
| EP | 0 540 850 A2 | 5/1993 | G02B/6/38 |
| JP | 56060406 | 5/1981 | G02B/7/26 |
| JP | 05-157943 | * 6/1993 | |

* cited by examiner

Primary Examiner—Hemang Sanghavi
(74) Attorney, Agent, or Firm—Nestor F. Ho

(57) ABSTRACT

A fiber optic connector having improved alignment and manufacturing characteristics over traditional connectors. A fiber optic connector of the present invention has a first connector ferrule and alignment means for aligning the first connector ferrule with a matching second connector ferrule. The fiber optic connector includes a first connector ferrule including a first mating surface. The mating surface defines at least one receiving cavity, and at least one protruding alignment rod is seated in the cavity and extends from the mating surface. The alignment rod has a diameter $D_1$ and protruded from the mating surface a protrusion distance $p_1$, wherein $p_1 \leq 2D_1$. In an exemplary embodiment the rod has a spherical tip and $0.5D_1 \leq p_1 \leq 2D_1$.

9 Claims, 9 Drawing Sheets

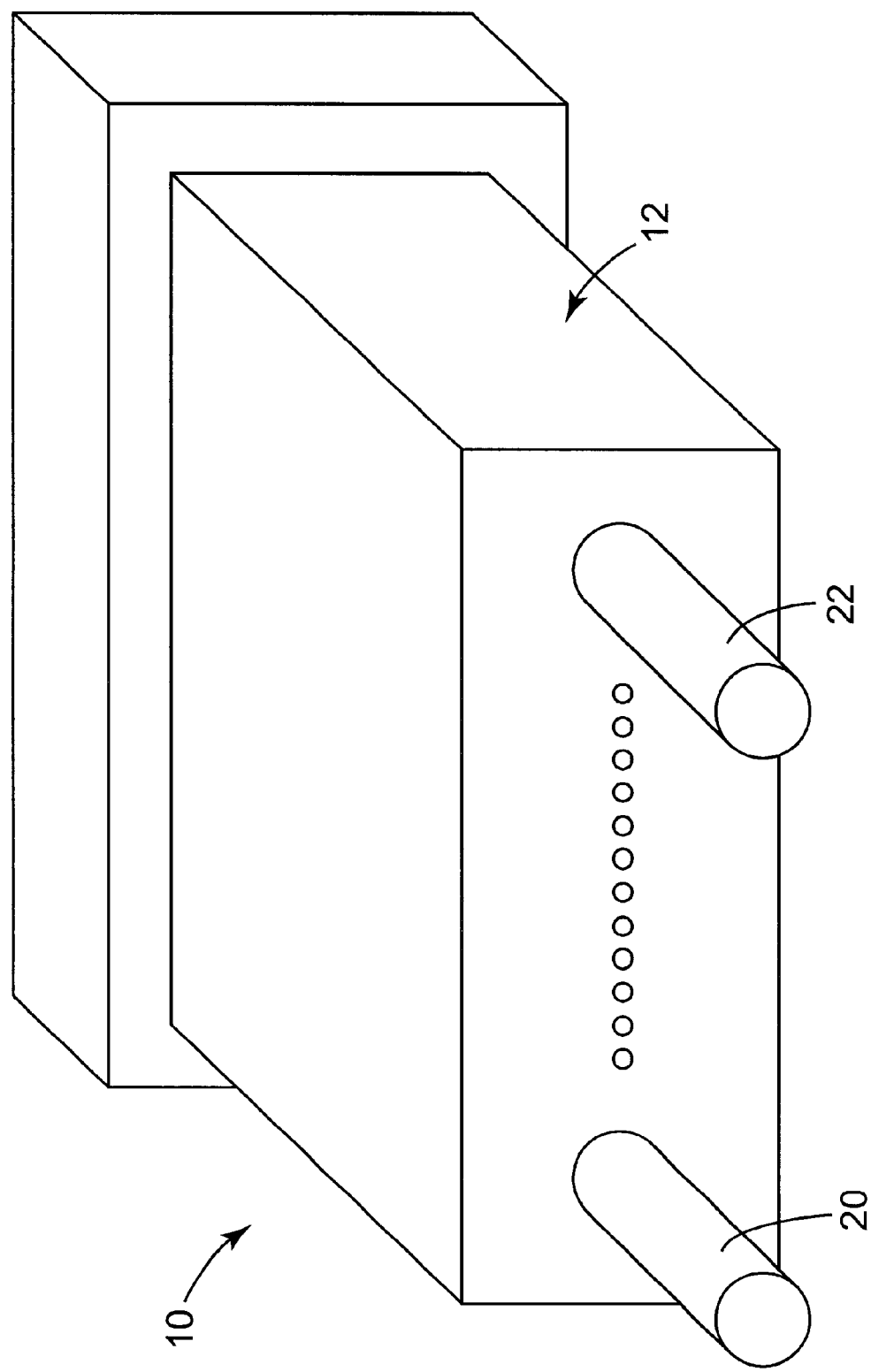

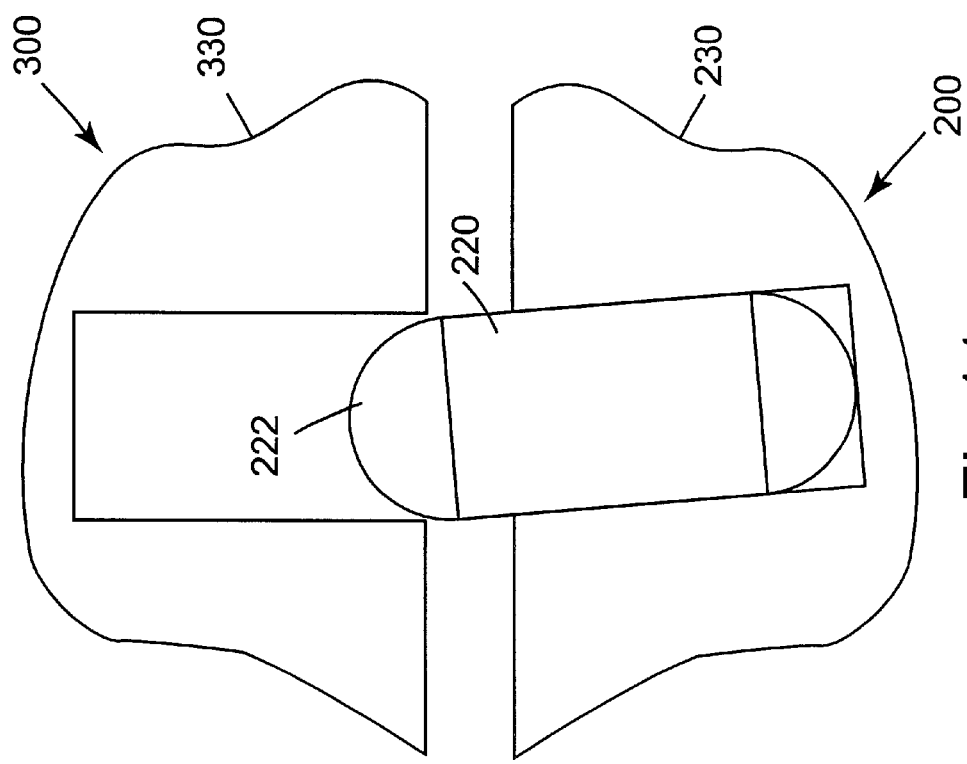
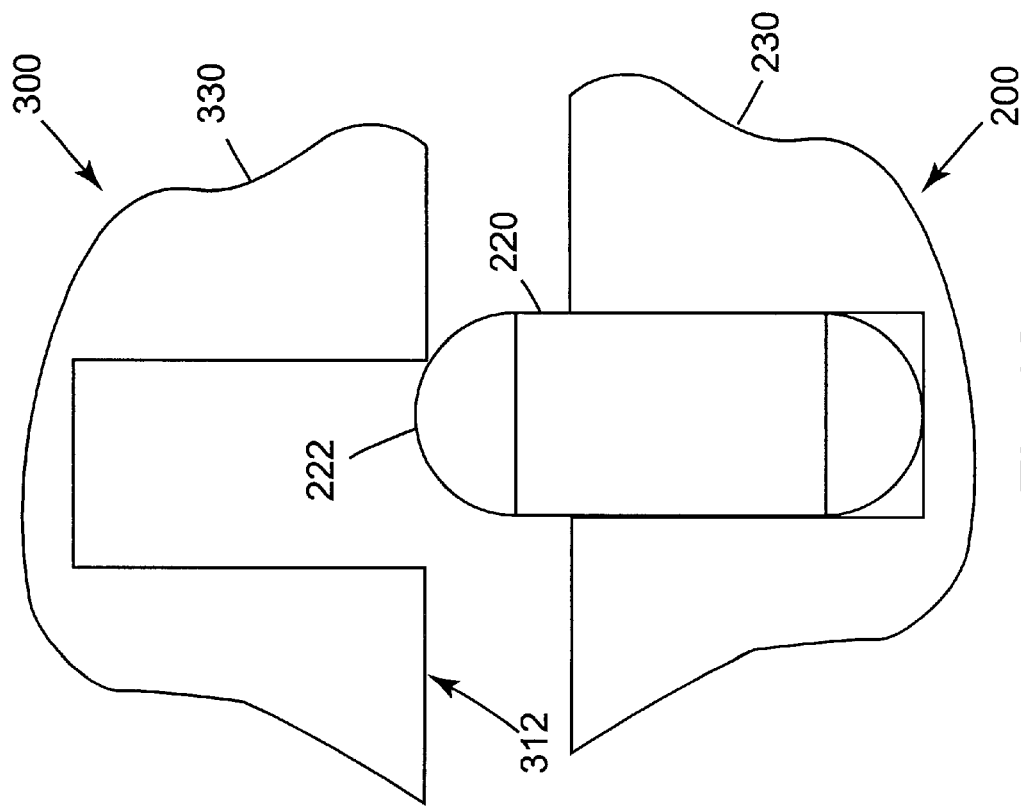

OPTICAL CONNECTOR USING LARGE DIAMETER ALIGNMENT FEATURES

RELATED APPLICATIONS

The present application is a continuation-in-part of U.S. application Ser. No. 08/953,950 filed Oct. 10, 1997 now U.S. Pat. No. 5,845,028, entitled "Alignment Assembly for Multifiber or Single Fiber Optical Cable Connector", which is a continuation of U.S. application Ser. No. 08/614,412 filed Mar. 12, 1996, issued as U.S. Pat. No. 5,778,123. The present application also is a continuation-in-part of U.S. patent application Ser. No. 08/819,247, entitled "Stubless Optoelectronic Device Receptacle", filed Mar. 17, 1997. All of the related applications are commonly assigned to the Assignee of the present invention and the disclosures of the above which are herein incorporated by reference.

FIELD OF THE INVENTION

The present invention relates generally to connectors for optical fibers and devices. In particular, the present invention relates to an optical connector including a rounded rod alignment feature.

BACKGROUND OF THE INVENTION

Optical fibers are increasingly being used for the transmission of optical signals. Optical fibers offer greatly increased transmission capability and transmission characteristics over traditional copper wires.

The use of optical fibers, however, does present some difficulties. Optical fibers are, in fact, conductors of light signals. To avoid losing or degrading the light signals being transmitted, there is a need for precise alignment and coupling any time optical fibers are connected to each other or to optical devices. Optic transfer efficiency is the term used to measure the ability of a connector to accurately couple the transmitted light signals.

Use of optical cables has generally been limited to large scale long haul trunking installations, such as those of the telecommunications industry, where the improved transmission characteristics of the optical fibers justify the greater expense and typical difficulty associated with their manufacturing and installation. Nevertheless, as demands on communication media and data volume continue to increase, the advantages of using optical cable for transmission of signals across shorter distances, or for interconnecting local devices, continues to grow. With this growth has come a need to connect fiber optic cables accurately and economically to each other and to a multiplicity of devices.

Of considerable relevance to the problem of developing practical fiber optic connectors is the question of the optic transfer efficiency at the connector. Various factors affect the optic transfer efficiency at a connector including (a) gap separation at the point of abutment, (b) lateral separation due to axial misalignment, and (c) thermal expansion characteristics of connectors.

Numerous optical cable connectors have been developed to aid in the connection of fiber optic cables. As data requirements grow, single fiber cables have given way to multiple fiber cables, such as parallel ribbon cables including a plurality of optical fibers aligned in parallel. As the number of fibers grow, such do the difficulties in maintaining the transfer efficiency of the connector.

Examples of known multi-fiber connectors include the MAC™ connector by Berg Electronics and the MT Connector by U.S. Conec. Further examples of optical connectors are illustrated in U.S. Pat. No. 5,420,952 to Katsura, et al.; U.S. Pat. No. 5,276,755 to Longhurst; U.S. Pat. No. 5,500,915 to Foley et al.; U.S. Pat. No. 4,784,457 to Finzell; U.S. Pat. No. 5,430,819 to Sizer, II, et al.; and U.S. Pat. No. 5,287,426 to Shahid.

Many of the known connectors have disadvantages associated with them. A MT-type connector, illustrated in FIG. 1, is one of the most common connectors currently used. Connector 10 includes a ferrule 12 having two protruding long pins 20 and 22. The proposed TIA/EIA-604-5 MT connector intermateability standard specifies that the alignment pins must protrude at least 2.285 pin diameters (1.6 mm protrusion for a 0.7 mm diameter pin) from the face of the ferrule.

Long thin pins, such as those of the MT connector, attempt to control movement of the connector in the x, y and z axis. Long pins may help achieve suitable optical connections for some applications and the coupling of pins and holes may be intuitive to users. However, the use of such long pins does present significant coupling, alignment, durability and manufacturing disadvantages.

As illustrated in FIGS. 2 and 3, during coupling of a MT-type connector, the ferrule 12 is interference fit upon a receptacle 14. The receptacle 14 defines a receiving orifice or hole 30. The pin 20 is inserted into the corresponding receiving hole 30. Significant insertion force is needed to seat each small diameter (~0.7 mm) pin fully into the respective hole. It has been calculated that the interference fit of a nominal MT connector pin inserted into a matching receptacle hole could require approximately six Newtons of force to fully seat. If the pins are not fully seated, an air gap between the two ferrules results that can cause severe light loss.

Correct alignment of the pins is very important before coupling. FIG. 2 illustrates a 0.5 mm lateral misalignment of the 0.7 mm MT connector pin 20. The small diameter of the pin 20 and of the matching receiving hole 30 results in complete failure to couple even under very small (e.g., half a millimeter) lateral misalignment.

FIG. 3 illustrates the effects of angular misalignment of pin 20. As the effects of even a small angular misalignment are magnified by the length of the pin, even a small angular misalignment (5 degrees) may again result in complete failure to couple.

If the pin 20 is not perfectly aligned before engagement into the mating hole 30, the pin 20 may miss the hole 30 and crack the mating ferrule 14 causing a catastrophic failure. The long and thin metal pins 20 and 22 also are liable to bend during insertion and withdrawal and damage the mating ferrule 14 on subsequent insertions. The high interference fit of the long pin to the mating hole can cause the hole to be "skived" and deposit unwanted debris onto the connector mating face which can cause signal failure. Because the pins protrude so far from the mating face of the MT, the mating face is difficult to clean.

Manufacture of a MT connector further requires tight control of the tolerances of at least nine critical dimensions: (1) pin diameter, (2) pin straightness, (3) pin taper, (4) hole diameter, (5) hole straightness, (6) hole angle, (7) hole taper, (8) hole placement relative to matching hole, (9) hole placement relative to fibers. Accordingly, the use of traditional alignment pins further drives up manufacturing difficulty and costs.

A further consideration is that the long protruding metal MT alignment pins have a tendency to act as "antennas" and may cause electro-magnetic interference when placed near high frequency components. This interference may in turn cause signal interference to other equipment and components.

An alternative optical connector design is disclosed in U.S. Pat. No. 5,778,123, entitled "Alignment Assembly for Multifiber or Single Fiber Optical Cable Connector", commonly assigned with the present invention to Minnesota Mining and Manufacturing and which is hereby incorporated by reference. The patent discloses a "ball and socket" alignment structure, illustrated in FIG. 4, where an opening or socket 130 in a ferrule 100 seats a ball 120, rather than a long pin. The opening 130 has a depth $d_1$. The ball 120 has a radius R, where $R>d_1$. The ball and socket structure offers significant advantages as the design does not overconstrain the z-axis alignment and requires control of only two manufacturing tolerances: the size of the alignment ball, which is easily controllable, and the spacing between the two openings.

However, the ball 120 offers only a limited bonding surface to the associated alignment hole 130. A limited bonding surface may result in inadequate bonding of the ball 120 to the ferrule 100. Also, the ball and socket design may be susceptible to damage from overpolishing of the ferrule and fiber ends. As illustrated in FIG. 5, overpolishing a ball-in-socket ferrule face may damage or obliterate the ball alignment opening or chamfer, thus inhibiting accurate attachment of the ball.

The opportunity remains for an improved optical connector and alignment feature.

SUMMARY OF THE INVENTION

The present invention is a fiber optic connector including a novel alignment feature having improved alignment and manufacturing characteristics over traditional connectors, while offering the advantages of both the traditional pin connectors and the ball-in-socket connector. The connector includes large diameter alignment rods tightly fit into appropriately sized holes to align optical fiber cores and produce a low loss optical interconnection. Large diameter rods are defined as rods wherein the rods have a diameter such that the rods protrude from the containing holes less than two rod diameters.

A fiber optic connector of the present invention has a first connector ferrule and alignment means for aligning the first connector ferrule with a matching second connector ferrule. In an exemplary embodiment, the fiber optic connector includes a first connector ferrule including a first mating surface. The mating surface defines at least one receiving cavity, and at least one protruding alignment rod is seated in the cavity and extends from the mating surface. The alignment rod has a diameter $D_1$ and protruded from the mating surface a protrusion distance $p_1$, wherein $p_1 \leq 2D_1$. In an exemplary embodiment the rod has a hemispherical tip and $0.5D_1 \leq p_1 \leq 2D_1$.

The fiber optic connector may further include a second connector ferrule having a second mating surface configured to be aligned opposite the first connector ferrule. The second mating surface defines a second receiving cavity having a depth $P_2$ wherein and $p_1<P_2$.

The second connector ferrule may further includes a second cavity and at least one second protruding alignment rod seated in the cavity, the alignment rod having a diameter $d_1$ and protruding from the mating surface a protrusion distance $p_1$, wherein $p_1<2d_1$. In turn, the first mating surface of the first connector ferrule may define a second receiving cavity having a depth $p_2$, wherein $p_1<p_2$, and wherein the first receiving cavity is configured to be aligned to receive the first alignment rod and the second receiving cavity is configured to be aligned to receive the second alignment rod.

The fiber optic connector may further include longitudinal grooves designed to receive at least one optical fiber. In an exemplary embodiment, the mating surfaces are positioned at a longitudinal end (defined by the direction of the optical fibers) of the connector ferrule.

In an alternative embodiment of the connector of the present invention, the connector ferrule defines a device-receiving cavity. An optoelectronic component is placed within the device-receiving cavity and a flexible circuit is electrically coupled to the optoelectronic component. In an exemplary embodiment, the flexible circuit encapsulates and protect the optoelectronic component within the receiving cavity. The flexible circuit may include at least one light-transmissive window optically aligned with the optoelectronic component.

BRIEF DESCRIPTION OF THE DRAWINGS

FIG. 1 is a perspective view of a MT-type connector.

FIG. 8 is an isometric view of the connector ferrule illustrated in FIG. 6 and supporting hardware.

FIG. 10 is a cross-sectional view of a laterally misaligned rod in a connector in accordance with the present invention.

FIG. 11 is a cross-sectional view of an angularly misaligned rod in a connector in accordance with the present invention.

DETAILED DESCRIPTION OF THE INVENTION

Figure 6:
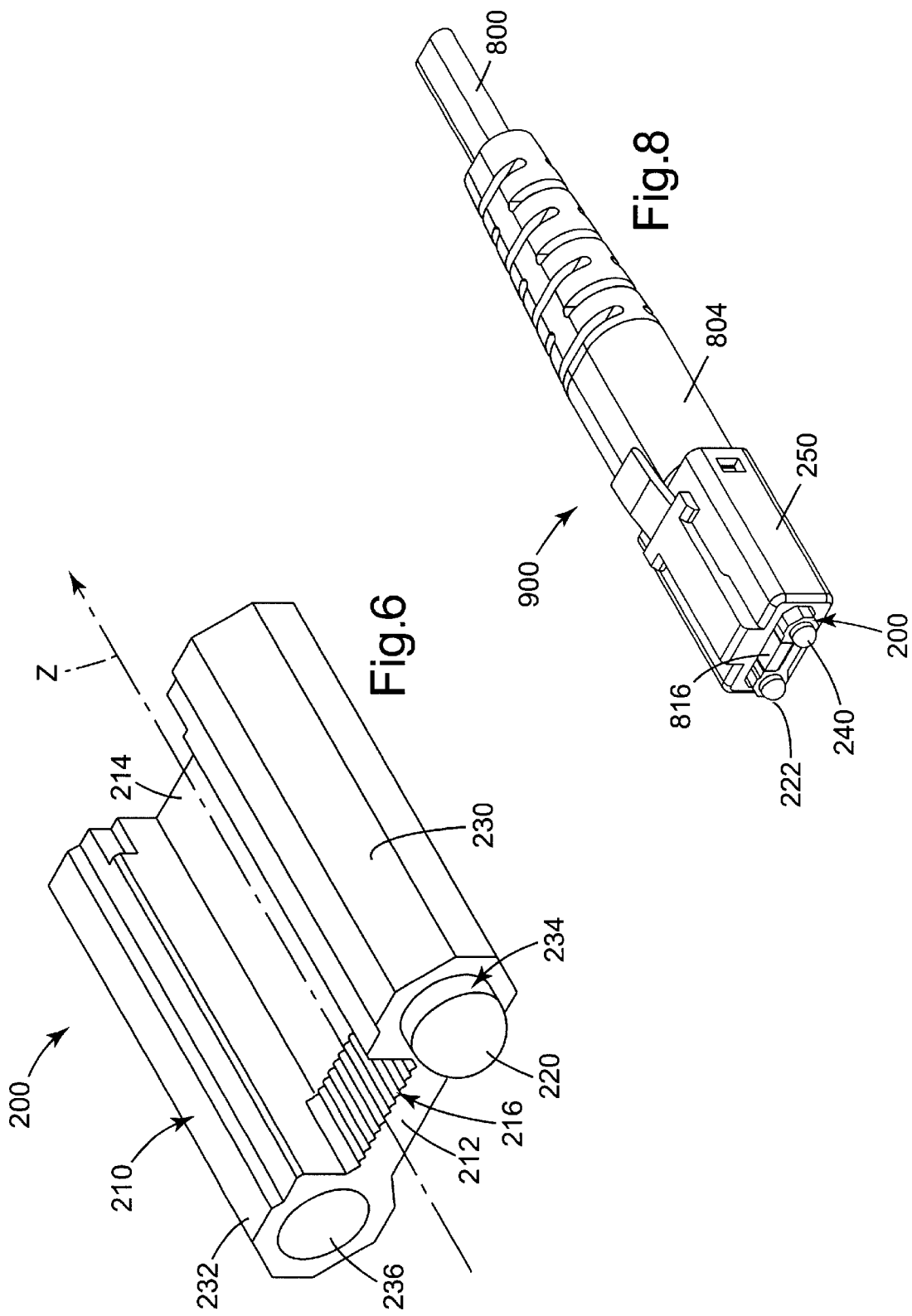
FIG. 6 is an isometric view of a connector ferrule in accordance with the present invention.

FIG. 6 illustrates an exemplary embodiment of a connector ferrule 200 in accordance with the present invention. The term connector in the present invention is meant to include devices for coupling and aligning two or more optical fiber cable ends, an optical fiber cable end with an optical device, or two or more optical devices. Accordingly, those skilled in the art will readily appreciate that the present invention may be utilized to align two optical fiber connector ferrules to one another, or alternately, to align one optical fiber ferrule to an optical source, detector, or other optical device.

The ferrule 200 includes an alignment block or body 210. For descriptive purposes, the longitudinal z-axis of the ferrule 200 is defined by the direction along which the ferrule 200 receives and aligns optical fibers. The body 210 has a mating surface 212 located at a longitudinal end of the body 210 and a fiber-receiving surface 214 located on a top middle portion of the body 210. The fiber-receiving surface 214 allows for top-loading of one or more optical fibers and includes a plurality of v-grooves 216 that retain and align the optical fibers in parallel. The body 210 further includes a first and a second receiving sockets 230 and 232 located longitudinally along the sides of the body 210. In the present exemplary embodiment, the body is composed of a thermoplastic, such as Fortron 6165A6 from the Ticona Company. The ferrule could also be made of any of many other materials including metal, ceramic, thermoset plastic, or other suitable materials.

Figure 7:
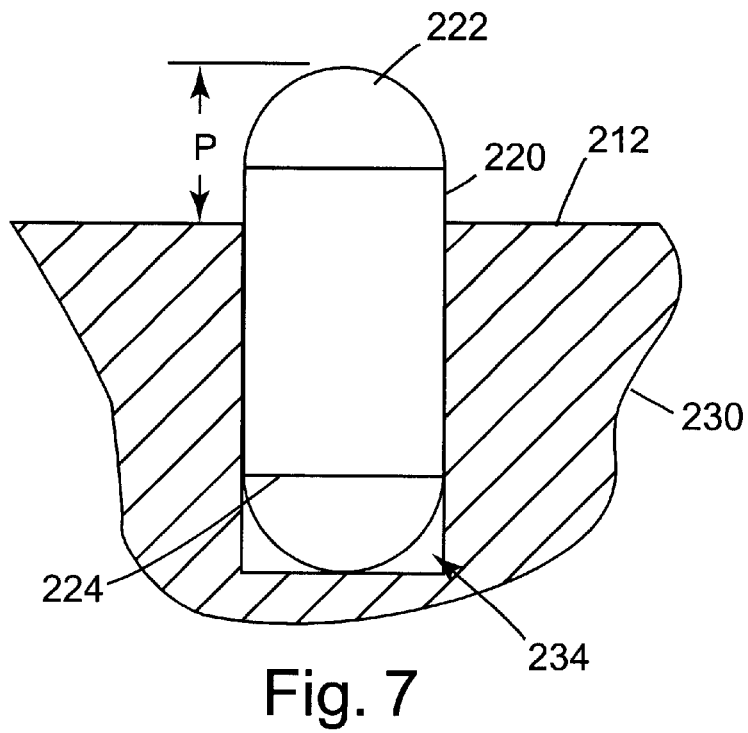
FIG. 7 is a cross-sectional view of a portion of a connector end of the connector ferrule illustrated in FIG. 6.

The sockets 230 and 232 define first and second receiving cavities 234 and 236 respectively. A longitudinal cross-section of socket 230 is illustrated in FIG. 7. An alignment rod 220 is interference fit into the receiving cavity 234 of socket 230. A second alignment rod 240 (illustrated in FIGS. 8 and 9) may be seated in the second receiving cavity 236.

In the present embodiment, the rod 220 is cylindrical and has a diameter D of 2.0 mm, a length of 6 mm and has spherical ends 222 and 224. The alignment rod 220 may be made of hard, durable materials, including plastic, metal, ceramic, or metal alloys, such as stainless steel alloy 303 SS. The receiving cavity 234 similarly is cylindrical and has a diameter of 2.0 mm and a depth of 4.5 mm. When inserted into the receiving socket 230, the alignment rod 220 protrudes a distance p of about 1.5 mm from the mating surface 212. The desired relationship between the protrusion distance p for a spherical tipped rod is between 0.5 to 2 times the diameter D of the rod 220 (i.e., $0.5D \leq p \leq 2.0D$), providing a sphere-ended post. For a spherically or hemispherically tipped rod a distance p of 0.5 D equals the radius of the sphere, thus allowing the full diameter of the rod to be available for alignment with an opposing receiving cavity.

In alternative embodiments, the shape of the rod and of the cavity may be polyhedral and the diameter of the cavity, depending on the material used for the body and the desired fit, may be slightly larger, equal or even smaller than D. In such embodiments, the diameter D is meant to be measured as the cross-sectional thickness of the rod. Also, the end geometry of the alignment rod may be a variety of shapes, such as spherically radiused, chamfered, or sloped. If the rod tip is not hemispherical, the rod could protrude less than 0.5 diameters, while preferably allowing the full diameter of the rod to be exposed for aligning the mating connector.

Figure 9:
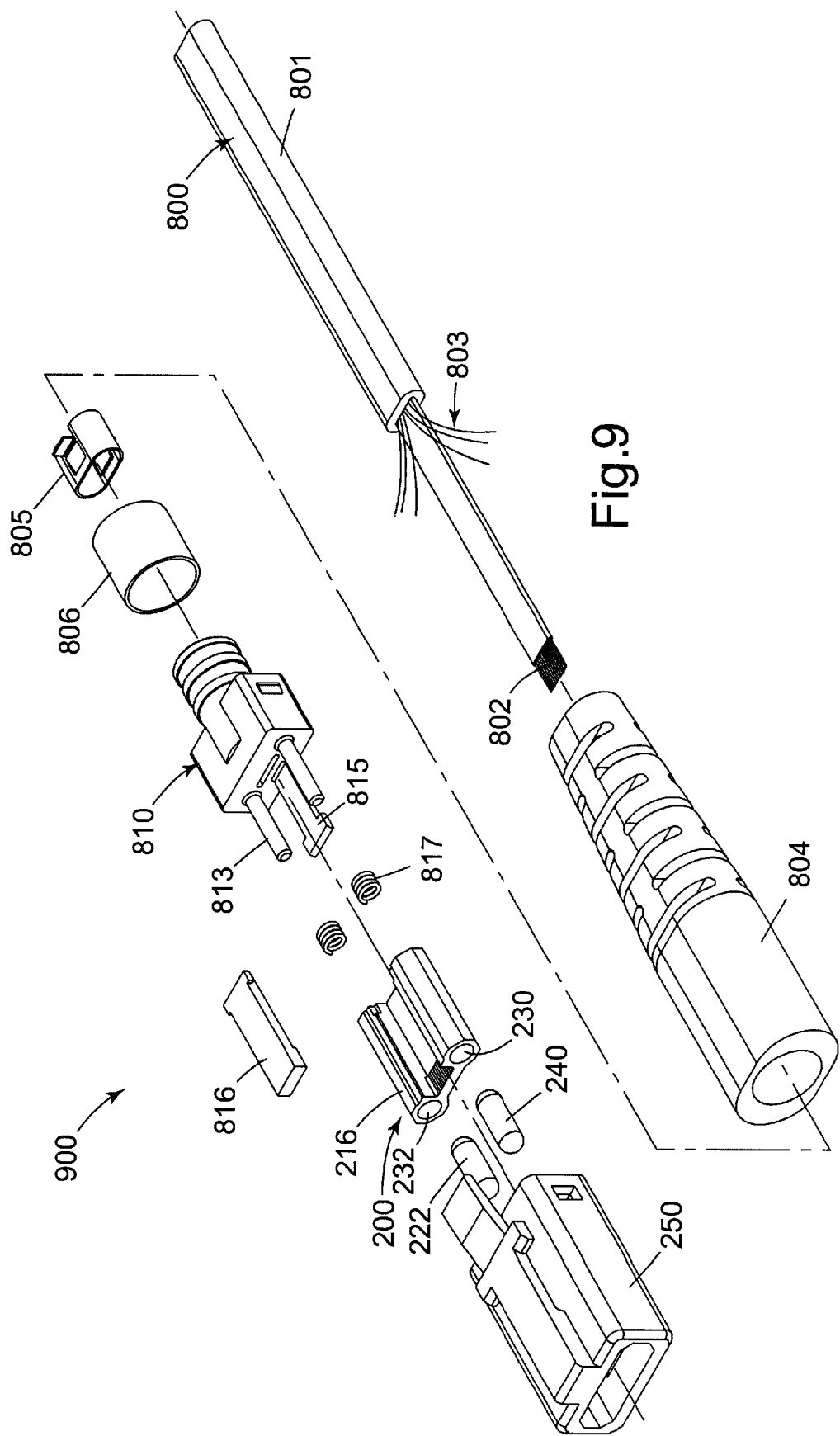
FIG. 9 is an exploded isometric view of a connector assembly in accordance with the present invention.

FIGS. 8 and 9 illustrate a connector ferrule assembly 900 including the ferrule 200. FIG. 8 illustrates an assembled connector showing the intermating of a fiber optic cable 800, a strain relief boot 804, a latching body 250, the ferrule 200, a ferrule cover 816, and alignment rods 220 and 240.

FIG. 9 illustrates an exploded view of the connector assembly 900. The fiber optic cable 800 includes an outer jacket 801, containing a fibrous kevlar strength member 803, which surrounds a horizontal array of optical fibers 802. The optic cable 800 is threaded into the strain relief boot 804, which restricts the bending of the cable 800. A cable jacket retention sleeve 805 is slid over cable 800 to prevent cable jacket 801 from slipping rearward within strain relief boot 804.

The optical fibers 802 are inserted into a connector body 810. The connector body 810 consists of a central body 811 connected to a crimp region 812, as well as ferrule alignment posts 813 and ferrule retention tongue 815. The cable strength member 803 is sandwiched between crimp region 812 and crimp ring 806. Crimp ring 806 is subsequently compressed, thus trapping strength member 803 between crimp region 812 and crimp ring 806.

Springs 817 are placed over ferrule alignment posts 813 and ferrule 200 is inserted over alignment posts 813 and retention tongue 815, thus compressing springs 817. The array of optical fibers 802 passes through connector body 810 and rests in ferrule 200, aligned to the v-grooves 216. The array 802 is then held in place by ferrule cover 816. The end of array 802 is polished flush with the ferrule mating surface 212. One or two alignment rods 220 are the inserted into ferrule sockets 230 and 232. Finally, latching body 250 is installed over the ferrule 200 and attached to connector body 810.

FIGS. 10–12 illustrated the coupling of ferrule 200 with a matching ferrule 300. The ferrule 300 is generally symmetrical to the ferrule 200 and includes an opposite mating surface 312 and matching opposite sockets 330. As illustrated in FIGS. 10–12, during coupling, the matching ferrule 300 may be placed opposite the ferrule 200. The rod 220 is aligned opposite a matching receiving cavity 336, while a rod 320 of the matching ferrule 320 is aligned opposite receiving cavity 236. The matching receiving cavity has a depth $P_2$, where $P_2 > P$. When the corresponding rods and cavities are matched, the v-grooves, and accordingly the optical fibers, become aligned.

Figure 2:
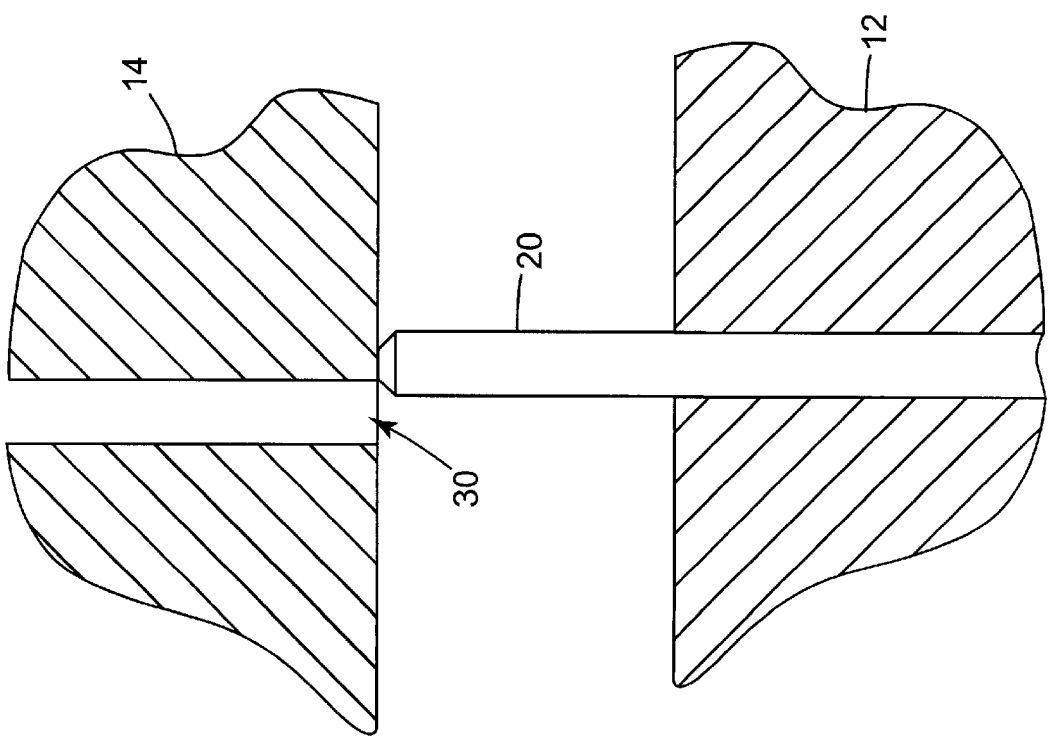
FIG. 2 is a cross-sectional view of a laterally misaligned pin of the connector illustrated in FIG. 1.
Figure 4:
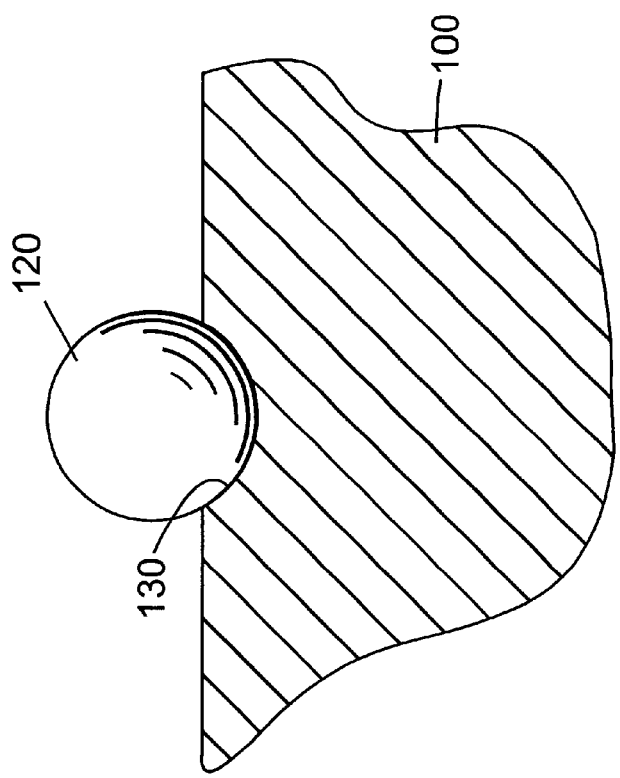
FIG. 4 is a cross-sectional view of a connector end of a ball and socket connector.
Figure 5:
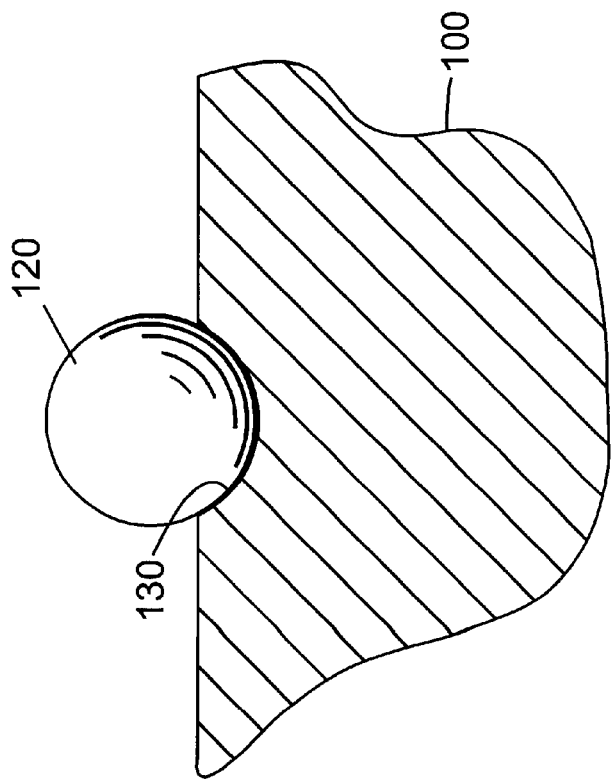
FIG. 5 is a cross-sectional view of a portion of an overpolished ball-and-socket connector.

The larger sphere ended post 220 of the present invention allows for much greater alignment mismatch and more reliable mating. Ease of mating is a significant improvement because many of the applications for the connector, such as connection between a daughtercard to a backplane, require "blind mate", that is, visual orientation of the connector prior to engaging is not possible. FIG. 10 illustrates how the large diameter rod 220 compensates for a 0.5 mm lateral misalignment, such as that previously illustrated in FIG. 2. The advantage is directly proportional to the diameter of the alignment feature; the larger the feature, the more misalignment the rod may accommodate.

Figure 3:
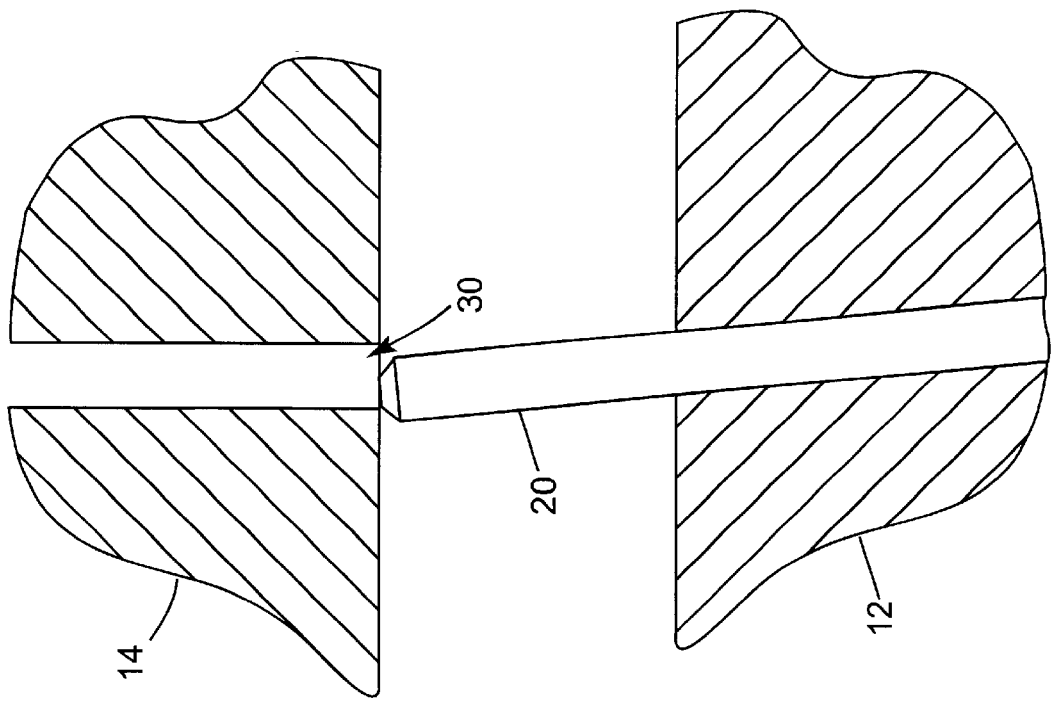
FIG. 3 is a cross-sectional view of an angularly misaligned pin of the connector illustrated in FIG. 1.
Figure 12C:
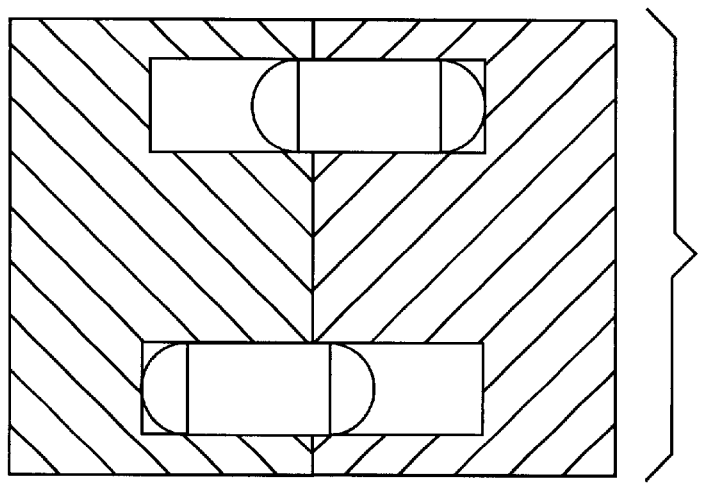
FIG. 12 is a cross-sectional view sequence illustrating two connector ferrules in accordance with the present invention registering to eliminate misalignment.
Figure 12B:
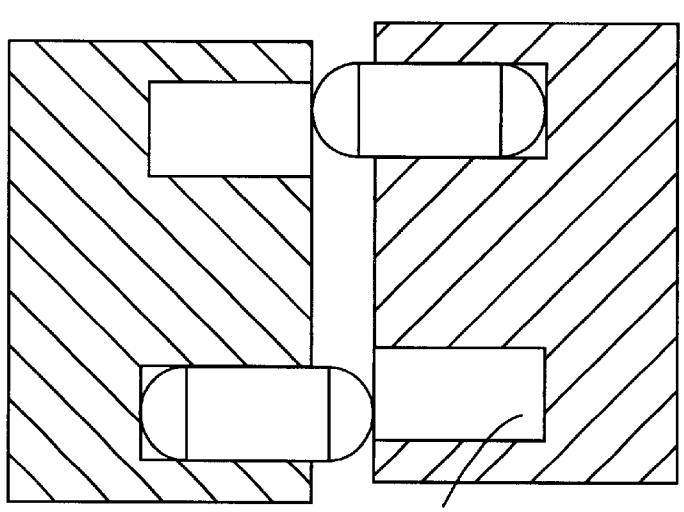
Figure 12A:
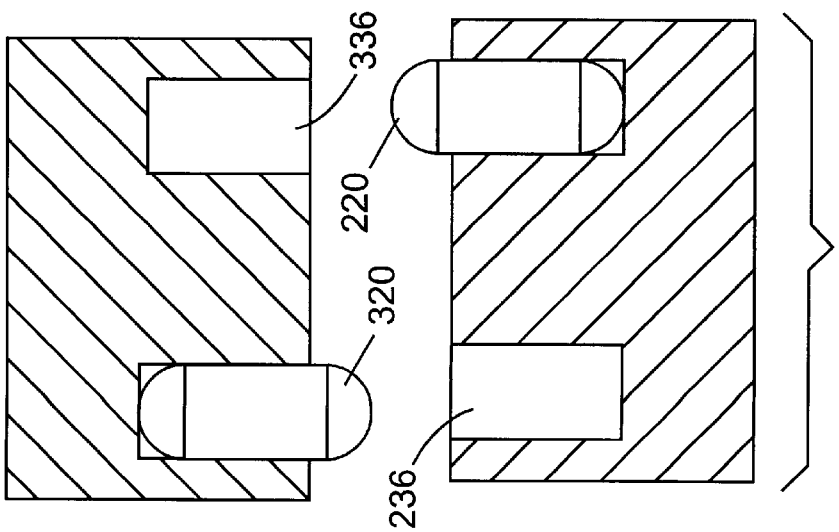

FIG. 11 illustrates compensation on an angular misalignment of the same magnitude as that previously illustrated in FIG. 3. An alignment rod with limited protrusion (from 0.5 to 2 rod diameters) is substantially less susceptible to misalignment based on angular inaccuracies in the alignment holes. In addition, a large diameter alignment rod with limited protrusion is less susceptible to bending and breakage than a thinner, more exposed alignment pin. FIG. 12 illustrates a mating sequence of ferrules 200 and 300, from initial alignment (FIG. 12A) to compensation for lateral misalignment (FIG. 12B), to coupling (FIG. 12C).

Figure 13:
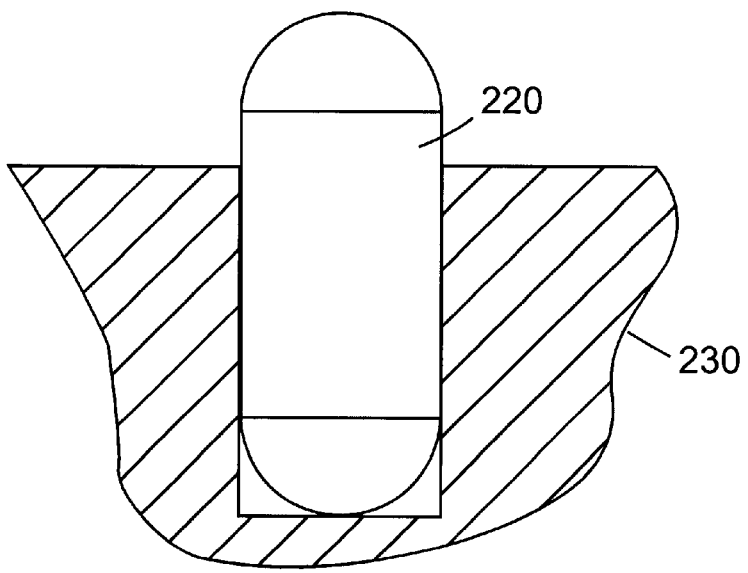
FIG. 13 is a cross-sectional view of an overpolished connector end for a connector in accordance with the present invention.

One further advantage of the connector of the present invention is a more robust bonding between the rod and the ferule. As illustrated in FIGS. 7 and 13, the larger sphere ended post offers a much larger bonding and seating area, which results in better adhesion between the rod and the ferrule. Also, as illustrated in FIG. 13, the present invention is less susceptible to overpolish. Overpolishing the face 212 of ferrule 200 merely results in slightly greater rod protrusion which has little effect on the alignment of the connector.

The larger diameter, smaller protruding rod arrangement of the present invention has other significant benefits. The rod has larger surface area to align the two ferrules and is not inserted as deeply into the socket as a long pin connector, thus dramatically decreasing the required insertion force.

Furthermore, since the sphere ended post is not sharp and does not penetrate the mating ferrule as deeply, unwanted debris is minimized. The sphere ended post connector is easy to clean, since the rod does not protrude far from the face. The present invention increases the reliability and quality of the interface. The sphere-ended post is much more robust and resistant to damage due to its larger cross-sectional area, and minimal protrusion from the connector face.

Finally, the present invention minimizes the unwanted "antenna effect" since the rod is significantly shorter than long pins and does not protrude as far out from the connector face as traditional pins.

Figure 14:
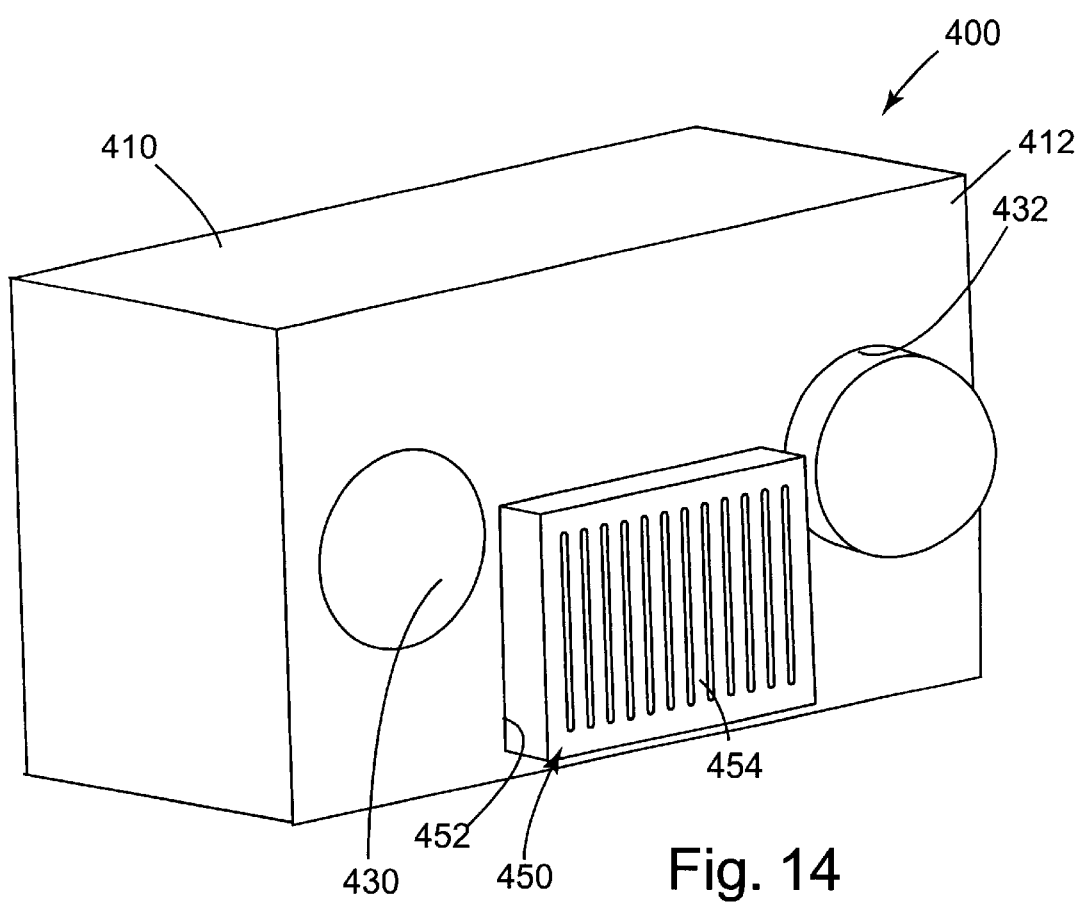
FIG. 14 is an isometric view of an optoelectronic device receptacle in accordance with the present invention.

Those skilled in the art will appreciate that the present invention may be used when coupling a variety of optical devices and even non-optical devices that require precise alignment. FIG. 14 illustrates an optoelectronic device receptacle in accordance with the present invention. Receptacle 400 includes a body or alignment block 410, having an engagement surface 412. The surface 410 defines a first and a second receiving cavity 430 and 432. An alignment rod 420 may be placed in either or both of sockets 430 and 432 to compliment to corresponding placement of rods within a matching ferrule, such as ferrule 200. The rod 420 has a diameter D and protrudes a distance between 0.5 to 2 times D from the engagement surface 412. The surface 410 further defines a device-receiving cavity 452. An optoelectronic component 450 is placed within the cavity. A flexible circuit 454 is placed over and is electrically coupled to the optoelectronic component. The flexible circuit 454 may have a plurality of windows 456 comprising of a light-transmitting polymer aligned with optical receptors or emitters of the optoelectronic component. The flexible circuit 454 encapsulates and protects the optoelectronic component within the receiving cavity 452.

Those skilled in the art will appreciate that the present invention may be used when coupling a variety of optical devices and even non-optical devices that require precise alignment. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A fiber optic connector comprising:
   a) a first connector ferrule including
      i) a first mating surface,
      ii) at least one protruding alignment rod extending from the mating surface, the alignment rod having a diameter $D_1$ and protruding from the mating surface a protrusion distance $p_1$, wherein $p_1 \leq 2D_1$.

2. The fiber optic connector of claim 1, further comprising
   a) a second connector ferrule having a second mating surface configured to be aligned opposite the first connector ferrule, the second mating surface defining a first receiving cavity having a depth $P_2$ wherein and $p_1 < P_2$.

3. The fiber optic connector of claim 1, wherein the alignment rod has a spherical tip.

4. The fiber optic connector of claim 1, wherein $0.5D_1 \leq p_1 \leq 2D_1$.

5. The fiber optic connector of claim 2, wherein
   a) the second connector ferrule further includes an at least one second protruding alignment rod, the alignment rod having a diameter $d_1$ and protruding from the mating surface a protrusion distance $p_1$, wherein $p_1 \leq 2d_1$,
   b) the first mating surface of the first connector ferrule defining a second receiving cavity having a depth $p_2$, wherein $p_1 < p_2$, and
   c) wherein the first receiving cavity is configured to be aligned to receive the first alignment rod and the second receiving cavity is configured to be aligned to receive the second alignment rod.

6. The fiber optic connector of claim 1, wherein the connector ferrule includes longitudinal grooves to receive at least one optical fiber, and wherein the mating surfaces is positioned at a longitudinal end of the connector ferrule.

7. The fiber optic connector of claim 1,
   a) wherein the connector ferrule defines a device-receiving cavity,
   b) the connector further comprising an optoelectronic component placed within the device-receiving cavity, and
   c) a flexible circuit electrically coupled to the optoelectronic component, wherein the flexible circuit encapsulates and protects the optoelectronic component within the receiving cavity.

8. The connector of claim 7, the optoelectronic component including a flexible circuit including at least one light-transmissive window optically aligned with the optoelectronic component.

9. A fiber optic connector comprising:
   a) a first connector ferrule including a mating surface;
   b) a large diameter alignment rod having a diameter D and a protruding length p from said mating surface, where $2D \geq p$ for aligning the first connector ferrule with a matching second connector ferrule;
   c) the second connector ferrule having a receiving cavity, that receives the large diameter alignment rod, where the receiving cavity has a diameter d, where $d \geq D$.

* * * * *